United States Patent [19]
Wuerfel

[11] 4,111,164
[45] Sep. 5, 1978

[54] VARIABLE DISPLACEMENT ARRANGEMENT IN FOUR CYCLE, RECIPROCATING INTERNAL COMBUSTION ENGINE

[76] Inventor: Robert P. Wuerfel, 4620 NW. 45 Ct., Ft. Lauderdale, Fla. 33319

[21] Appl. No.: 837,030

[22] Filed: Sep. 27, 1977

[51] Int. Cl.² .......................................... F02B 75/04
[52] U.S. Cl. .............................. 123/78 E; 123/197 AB
[58] Field of Search ............. 123/48 B, 78 E, 197 AB

[56] References Cited

U.S. PATENT DOCUMENTS

| | | | |
|---|---|---|---|
| 1,385,758 | 7/1921 | Schultz | 123/78 E |
| 1,539,769 | 5/1925 | Poillon | 123/78 E |
| 1,610,137 | 12/1926 | Kratsch | 123/78 E |
| 1,637,245 | 7/1927 | Scully | 123/78 E |
| 2,179,185 | 11/1939 | Jerrell et al. | 123/197 AB |
| 2,248,323 | 7/1941 | Anthony | 123/78 E |
| 2,252,153 | 8/1941 | Anthony | 123/78 E |
| 2,372,472 | 3/1945 | Campbell | 123/78 E |

FOREIGN PATENT DOCUMENTS

| | | | |
|---|---|---|---|
| 509,982 | 11/1920 | France | 123/197 AB |
| 1,169,990 | 1/1959 | France | 123/78 E |
| 358,563 | 11/1921 | Fed. Rep. of Germany | 123/78 E |

*Primary Examiner*—Charles J. Myhre
*Assistant Examiner*—David D. Reynolds
*Attorney, Agent, or Firm*—Oltman and Flynn

[57] ABSTRACT

A compression spring coupling is provided between the engine piston and the crankshaft in a four cycle, reciprocating, internal combustion engine. This spring, when extended to the full extent permitted, is held compressed by a force equal to the piston force required to compress the fuel mixture for proper combustion under no load or very light load. Under no load on the engine the spring acts as a stiff coupling between the engine piston and the crankshaft. At heavier loads the spring is resiliently compressed in proportion to the load. The engine displacement is substantially smaller at no load and light loads than under heavy loads.

7 Claims, 6 Drawing Figures

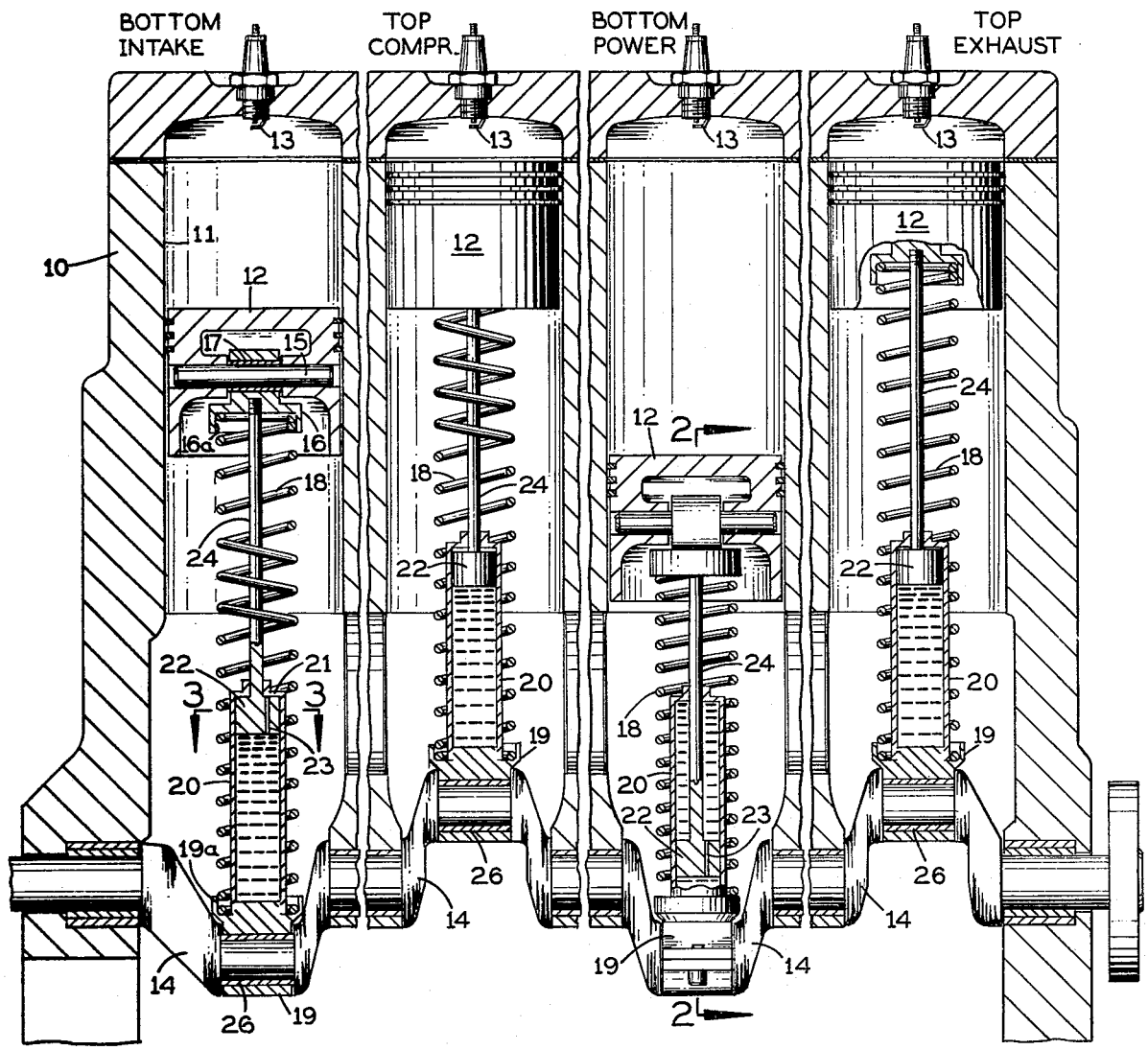
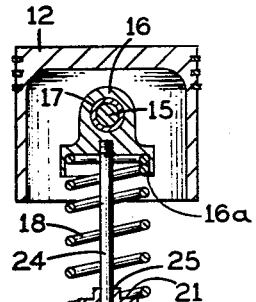
FIG. 2
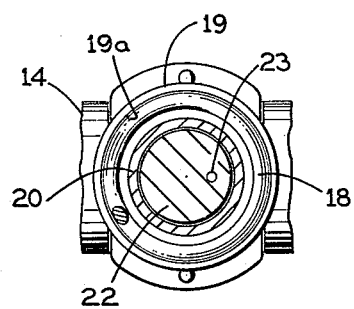
FIG. 3
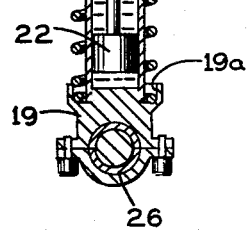

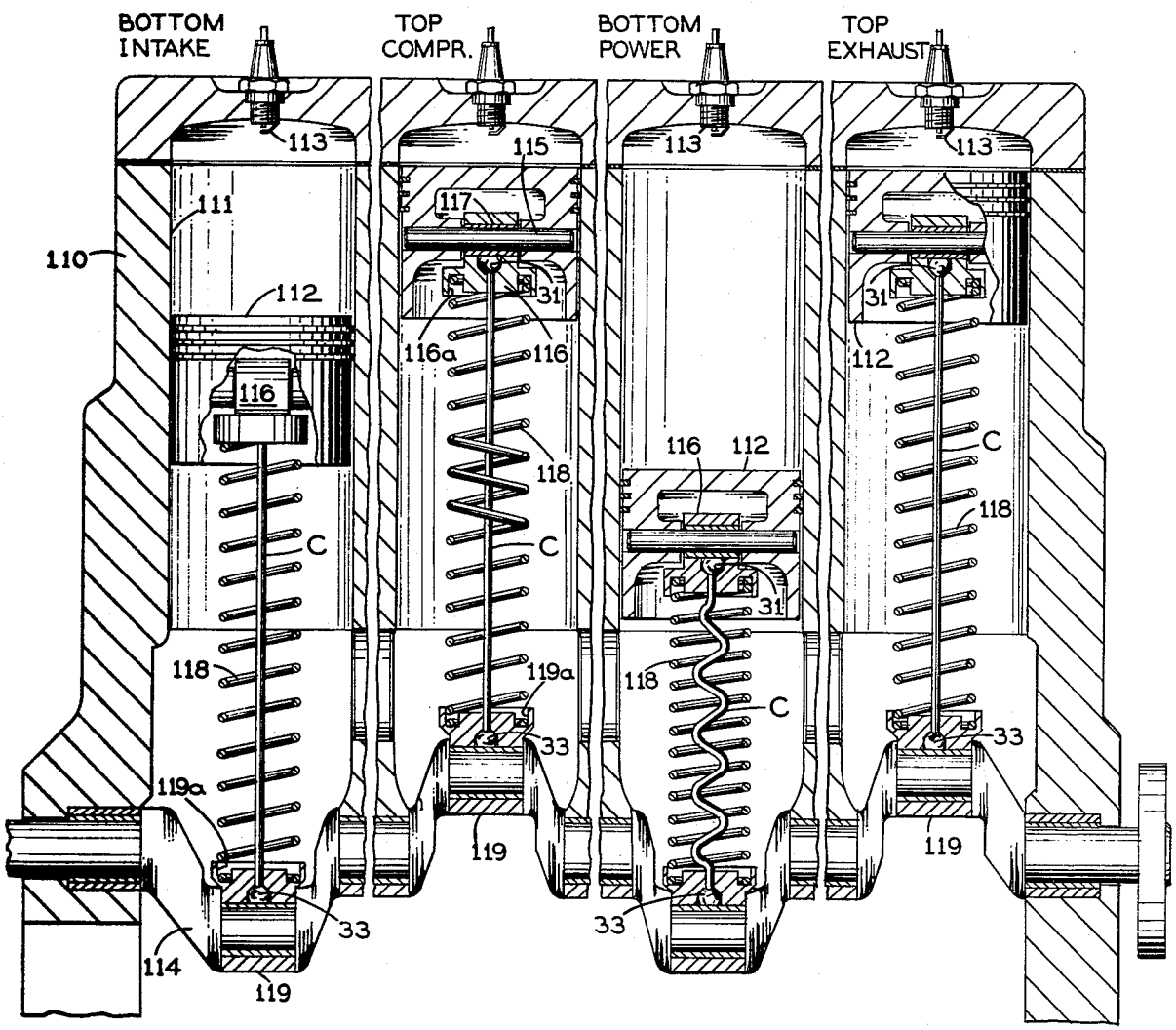
FIG. 4
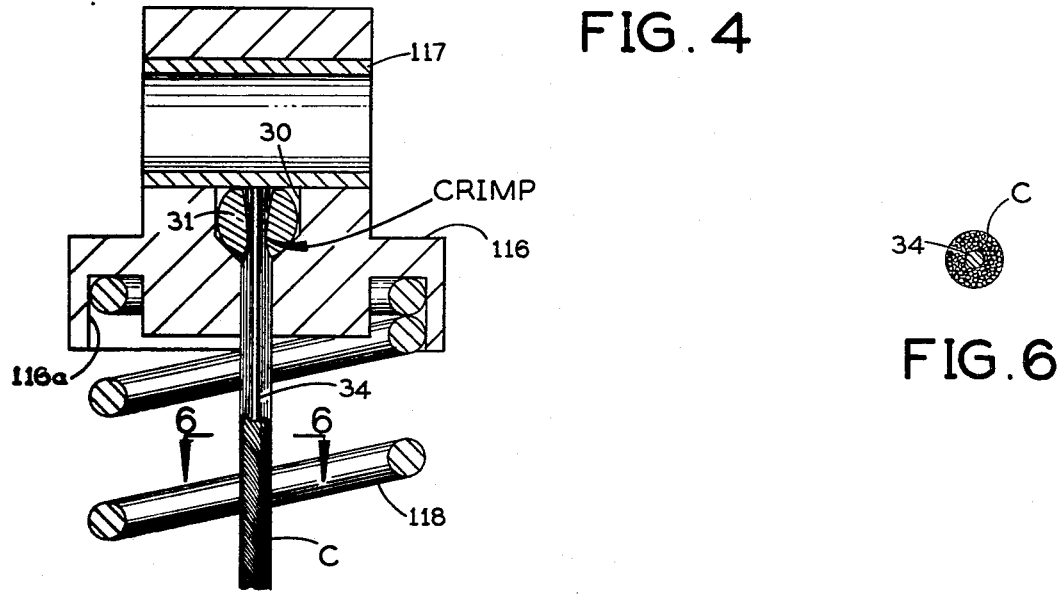
FIG. 5
FIG. 6

VARIABLE DISPLACEMENT ARRANGEMENT IN FOUR CYCLE, RECIPROCATING INTERNAL COMBUSTION ENGINE

BACKGROUND OF THE INVENTION

In the conventional four cycle, reciprocating, internal combustion engine, particularly on automotive vehicles, the engine typically is operating under substantially no load or light load much of the time. During such no load or light load conditions only a relatively small engine displacement is needed. It is only when the engine is under heavy load that higher engine displacement is required, such as when starting or accelerating the vehicle. However, these heavy load conditions dictate the engine displacement even when light load conditions are involved because the engine must have the capacity to handle the heavy load conditions satisfactorily.

Thus, there has existed the problem of improving the efficiency of such engines by automatically varying the engine displacement in accordance with the load on the engine, with the engine displacement being minimized under no load conditions and greatly increased under high load conditions.

U.S. Pat. No. 2,372,472 to Campbell discloses an internal combustion engine which is superficially similar to the present invention in that it provides a coil spring under compression between each engine piston and the engine crankshaft. The purpose of this arrangement, as explained in the Campbell patent, was to enable the piston to travel farther on the exhaust stroke than on the compression stroke. A portion of the initial power of the explosion in the cylinder is said to be stored in and then released by this spring to the crankshaft. Also, the longer exhaust stroke is said to exhaust from the cylinder a larger percentage of the spent gases. However, the Campbell patent does not address itself to the problem of varying the engine displacement in accordance with the actual load on the engine.

SUMMARY OF THE INVENTION

The present invention is directed to a novel and advantageous solution of this problem.

In accordance with the present invention, the engine displacement is varied in accordance with the load by providing a spring acting between each engine piston and the crankshaft so as to provide a stiff coupling between them under engine idle or other substantially no load conditions and to provide a resiliently deformable coupling under heavy load which deforms in proportion to the load. The present invention provides means limiting the expansion of this spring, so that when expanded to the full extent permitted the spring is compressed with a force equal to the piston force required to compress the fuel mixture during the compression stroke for proper combustion when the engine is under substantially no load.

In a first embodiment of this invention, the means for limiting the spring expansion comprises a piston operating in a hydraulic cylinder and having a dashpot orifice. This dashpot piston is connected by a rigid stem to the engine piston for reciprocation in unison with the latter. Preferably, the spring at one end loosely encircles the hydraulic cylinder and bears against the crankshaft there.

In a second embodiment of this invention, the means for limiting the spring expansion is a flexible cable extending between each engine piston and the crankshaft. Preferably, a spring is embedded in this cable for causing it to assume a helical shape when slack so as to avoid interference with the spring which couples the engine piston to the crankshaft.

A principal object of this invention is to provide a novel and improved arrangement in a four cycle, reciprocating, internal combustion engine for varying the engine displacement in accordance with the load on the engine.

Another object of this invention is to provide such an arrangement which provides a coupling between the engine piston and the crankshaft which is still at little or no load on the engine and is progressively deformable resiliently as the load on the engine increases.

Another object of this invention is to provide such an arrangement having a spring that is maintained at all times under a compressive force at least equal to the piston force required to compress the fuel mixture during the compression stroke for adequate combustion when the engine is operating under substantially no load or very light load.

Further objects and advantages of this invention will be apparent from the following detailed description of two presently-preferred embodiments thereof, which are shown in the accompanying drawings in which:

FIG. 1 is a sectional view through one cylinder of an engine in accordance with a first embodiment of this invention, showing in successive panels the engine piston and the crankshaft (1) at the bottom of its intake stroke, (2) at the top of its compression stroke, (3) at the bottom of its power stroke, and (4) at the top of its exhaust stroke;

FIG. 2 is a vertical section taken along the line 2—2 in FIG. 1;

FIG. 3 is a cross-section taken along the line 3—3 in FIG. 1;

FIG. 4 is a view similar to FIG. 1 of a second embodiment of this invention;

FIG. 5 is an enlarged sectional view showing the cable connection to the engine piston in FIG. 4; and FIG. 6 is a cross-section through the cable, taken along the line 6—6 in FIG. 5.

Before explaining the disclosed embodiments of the present invention in detail it is to be understood that the invention is not limited in its application to the details of the particular arrangements shown, since the invention is capable of other embodiments. Also, the terminology used herein is for the purpose of description and not of limitation.

Referring to FIG. 1, the present invention is shown embodied in a four cycle, reciprocating, internal combustion engine having any desired number of cylinders, such as four, six or eight. FIG. 1 shows a single such cylinder 10 having a cylindrical bore 11 in which a piston 12 is slidably reciprocable. The upper end of the cylinder is provided with the usual valved inlet and exhaust ports (not shown), and a spark plug 13 for igniting the combustible fuel mixture at appropriate times. The usual engine crankshaft 14 is to be driven by the piston so that the reciprocation of the pistons inside the respective cylinders will cause the crankshaft to rotate.

The piston 12 carries a wrist pin 15 which pivotally supports a flanged coupling head 16 at the recessed bottom of the piston. An anti-friction bushing 17 is engaged between the wrist pin 15 and this coupling head.

The coupling head 16 defines a downwardly-facing, cylindrical recess 16a which snugly receives the upper end of a coil spring 18. The lower end of this spring is snugly received in a similar upwardly-facing, cylindrical recess 19a on a twopiece annular coupling head 19 which is rotatably mounted on the crankshaft 14 by a bushing 26.

In accordance with the present invention, the coupling spring 18 is maintained under a predetermined compression when expanded to the full extent permitted in this assembly (e.g., at the top of its exhaust stroke). At this time the compressive force on the spring equals the piston force required to compress the fuel mixture during the compression stroke enough for adequate combustion when the engine is under substantially no load (e.g., idling) or under very light load. Consequently, under those conditions the spring 18 will act as a stiff, virtually rigid coupling between the engine piston 12 and the crankshaft 14, and virtually no additional compression of the spring will take place during the power stroke of the engine piston 12.

This is not true, however, when the engine is operating under heavy load, such as in starting or accelerating the vehicle. Under those circumstances, the spring 18 will be compressed axially more or less in proportion to this increased load.

In the embodiment of FIGS. 1-3, this means for limiting the spring expansion, and thus compressing it, includes a small cylinder 20 having its lower end closed by the coupling head 19 on the crankshaft and having a transverse top wall 21 which provides an upper limit stop for a small piston 22. The cylinder 20 is filled with oil or other hydraulic fluid and therefore it will be referred to hereinafter as the "hydraulic cylinder" (to distinguish it from the engine cylinder 10). The piston 22 is formed with a longitudinal bore 23 which provides a flow restriction for the hydraulic fluid when this piston is displaced in either direction along the hydraulic cylinder 20. This provides a cushioning or dashpot action, and therefore the piston 22 will be called the "dashpot piston" (to distinguish it from the engine piston 12). A rigid elongated stem 24 extends slidably through a central opening 25 in the top wall 21 of the hydraulic cylinder 20 and connects the dashpot piston 22 to the coupling head 16 on the engine piston 12.

During the operation of the engine the hydraulic cylinder 20 and dashpot piston 22 aid the spring 18 in opposing movement of the engine piston 12 toward the crankshaft 14. Therefore, the hydraulic cylinder and dashpot piston add to the stiffness of the spring 18, and thus are part of the coupling between the engine piston and the crankshaft. Under no load the dashpot piston 22 remains at the upper end of the hydraulic cylinder 20, and the spring 18 undergoes virtually no additional compression, so that it provides a substantially fixed-length coupling between the engine piston and the crankshaft throughout the intake, compression, power and exhaust strokes.

At the bottom of the intake stroke and the top of the exhaust stroke there is virtually no resistance in the engine cylinder above the engine piston 12. Under these circumstances the expansion of spring 18 is limited only by the engagement of the dashpot piston 22 against the transverse top wall 21 of the hydraulic cylinder 20. These parts coact to maintain the spring 18 compressed with a force equal (and opposite) to the piston force which must be applied to the fuel mixture to compress the latter enough for proper combustion when the engine is under substantially no load.

When the engine is under substantial load, during the power stroke (FIG. 2 and the third panel from the left in FIG. 1) the dashpot piston 22 moves down along the hydraulic cylinder 20 and the spring 18 is compressed substantially, becoming substantially shorter in length than its expanded length at the top of the exhaust stroke, for example.

During the compression stroke (the second panel from the left in FIG. 1) the spring is compressed and is shortened, but not as much as during the power stroke. This additional spring compression reduces the engine piston's compression of the fuel mixture during the compression stroke.

During the intake stroke (the first panel in FIG. 1) and the exhaust stroke (the last panel), the spring 18 is expanded to the full extent permitted by the assembly and it provides a stiff coupling between the engine piston and the crankshaft. During these strokes the dashpot piston 22 moves to the top of the hydraulic cylinder 20, as shown in FIG. 1.

The orifice 23 provides a dashpot effect to cushion the movement of the dashpot piston 22 along the hydraulic cylinder 20.

It is to be understood that the cylinder 20 might be filled with air or other gaseous fluid in place of the hydraulic liquid described, if desired. Cylinder and spring may be in series.

Also, if desired, the coil spring 18 might be omitted and the dashpot piston and cylinder used as the entire spring coupling (hydraulic or pneumatic) between the engine piston and the crankshaft.

Referring to FIG. 4, in this second embodiment of the invention, elements which correspond to those in FIG. 1 have the same reference numerals as in FIG. 1 plus 100, and the detailed description of these elements will not be repeated.

As shown in FIG. 4, a flexible cable C extends between the coupling head 116 attached to the engine piston 112 and the coupling head 119 on the crankshaft 114. Referring to FIG. 5, the coupling head 116 is formed with a socket 30 just below the bushing 117. A ball 31 is slidably received in this pocket and is crimped tightly around the upper end of the cable C. The ball and socket provide a universal joint between the cable C and the engine piston 112.

A similar ball and socket joint 33 (FIG. 4) is provided at the lower end of cable C to connect the cable there to the coupling head 119 on the crankshaft.

The cable C preferably comprises a multiplicity of strands wound around a core wire 34 (FIG. 6) which before being enclosed by the cable strands is preformed into a helical configuration. Consequently, when the cable is slack the helically preformed central core causes the entire cable to assume a helical configuration, as shown in the third panel from the left in FIG. 4. The diameter of the cable helix is substantially smaller than that of the spring 118 so that there is no interference between the two.

In FIGS. 4-6 the cable C replaces the rigid stem 24, dashpot piston 22 and hydraulic cylinder 20 in FIGS. 1-3 as the means for limiting the expansion of the spring which couples the engine piston to the crankshaft.

In FIG. 4 the length of the cable C is such that when it is fully extended and taut it maintains the coupling spring 118 under compression with a force equal to the engine piston force required to compress the engine fuel mixture for proper combustion.

In this embodiment also, at substantially no load on the engine the spring 118 acts as a stiff coupling between the piston 112 and the crankshaft 114, and very little, if any, additional compression and shortening of this spring take place. Under these circumstances the cable C will remain fully extended and taut.

Under heavy load, the spring 118 will be compressed and will become substantially shorter during the power stroke, and the cable C will slacken to a helical configuration, as shown in the third panel from the left in FIG. 4.

In one practical embodiment, the crank radius may be 1.25 inch and the engine piston displacement may vary from 2.5 inches when the engine is idling to 6.5 inches under the heaviest load. Therefore the engine displacement under heavy load is 2.6 times the engine displacement when idling.

The coupling spring 18 or 118 may have a non-linear rate, such as by having a faster initial compression rate than its final compression rate as full compression of the spring is approached. This might be achieved in various ways, such as by designing the spring with a conical taper so that its cross-sectional size near the engine piston is less than its size near the crankshaft. Such a non-linear spring rate would improve the vehicle acceleration. The cable C in the second embodiment may itself be a tension spring which need not be fully extended if the tension on it is sufficient to compress the main spring 118 as previously described.

I claim:

1. In a four cycle, reciprocating, internal combustion engine having a cylinder, a piston reciprocable in said cylinder, means for introducing a fuel mixture into the cylinder, means for igniting the fuel mixture, means for exhausting the burned gases from the cylinder, an engine crankshaft, and compression spring means acting between said piston and said crankshaft to cause crankshaft rotation in response to piston reciprocation, the improvement which comprises:

means limiting the expansion of said spring means to compress the latter with a force at least substantially equal to the piston force required to compress the fuel mixture in the cylinder for proper combustion when the engine is under substantially no load, whereby said spring means provides a substantially stiff coupling between the piston and the crankshaft when the engine is under substantially no load and provides a resiliently compressible coupling when the engine is under substantial load;

said spring means being compressible between said piston and said crankshaft substantially in proportion to said substantial load on the engine.

2. An engine according to claim 1, wherein said limiting means comprises:

a fluid-filled second cylinder;

a second piston slidable in said second cylinder and having a small orifice which provides a dashpot action for the fluid in said second cylinder;

and a rigid stem connecting said second piston to said first-mentioned piston.

3. An engine according to claim 2, wherein said second cylinder is filled with hydraulic fluid.

4. An engine according to claim 2, wherein said spring means comprises a coil spring which at one end loosely encircles said second cylinder and is operatively connected thereat to the crankshaft and at is opposite end is coupled to said first-mentioned piston.

5. An engine according to claim 1, wherein said limiting means comprises a flexible cable connecting said piston to said crankshaft.

6. An apparatus according to claim 5, wherein said spring means is a coil spring engaged between the engine piston and the crankshaft, and said cable extends centrally through said coil spring.

7. An apparatus according to claim 6, and further comprising a helical spring core in said cable for causing it when slack to assume a helical configuration spaced inside the turns of said coil spring.

* * * * *